A. A. KENT.
AUTOMATIC SPARK ADVANCING MECHANISM.
APPLICATION FILED FEB. 21, 1911.

1,192,787.

Patented July 25, 1916.
5 SHEETS—SHEET 1.

INVENTOR
Arthur Atwater Kent.

WITNESSES

BY

ATTORNEY

A. A. KENT.
AUTOMATIC SPARK ADVANCING MECHANISM.
APPLICATION FILED FEB. 21, 1911.

1,192,787.

Patented July 25, 1916.
5 SHEETS—SHEET 2.

WITNESSES

INVENTOR
Arthur Atwater Kent.

BY

ATTORNEY

A. A. KENT.
AUTOMATIC SPARK ADVANCING MECHANISM.
APPLICATION FILED FEB. 21, 1911.

1,192,787.

Patented July 25, 1916.

INVENTOR
Arthur Atwater Kent.

WITNESSES
F. J. Hartman.
S. B. Moulton.

BY Alston B. Moulton
ATTORNEY

A. A. KENT.
AUTOMATIC SPARK ADVANCING MECHANISM.
APPLICATION FILED FEB. 21, 1911.

1,192,787.

Patented July 25, 1916.
5 SHEETS—SHEET 5.

INVENTOR
Arthur Atwater Kent.

WITNESSES

BY
ATTORNEY

UNITED STATES PATENT OFFICE.

ARTHUR ATWATER KENT, OF PHILADELPHIA, PENNSYLVANIA.

AUTOMATIC SPARK-ADVANCING MECHANISM.

1,192,787. Specification of Letters Patent. Patented July 25, 1916.

Application filed February 21, 1911. Serial No. 609,859.

*To all whom it may concern:*

Be it known that I, ARTHUR ATWATER KENT, a citizen of the United States, and a resident of the city and county of Philadelphia, State of Pennsylvania, have invented certain new and useful Improvements in Automatic Spark-Advancing Mechanisms, of which the following is a full, clear, and exact disclosure.

It is well understood by those familiar with the operation of internal combustion engines that the efficiency of the engine is greatly affected and modified by the time when, or point in the stroke of the pistons where, the fuel in the cylinder is ignited and exploded, and that in order to obtain economic and efficient results the point in the stroke at which the igniting spark is made, and the charge in the cylinder is exploded, varies with, and is dependent upon, the speed at which the piston is traveling. Generally speaking, as the speed of the engine increases the point in the stroke at which ignition takes place should be correspondingly advanced and conversely as the speed of the engine decreases the said point should be correspondingly retarded.

In engines designed to be run at a substantially constant speed the matter of adjusting the time of the explosion or ignition of the fuel is not attended with much difficulty as the spark may be comparatively regulated and controlled either by hand or by some ordinary types of centrifugal governors. But in internal combustion engines designed to run sometimes at high and sometimes at low speeds, the ordinary centrifugal governor is not well adapted, because the centrifugal force of the fly-balls or weights does not vary directly proportionally to the speed, that is to say, the effective centrifugal force of the fly-balls or weights varies rapidly with the speed of rotation and with the distance between the balls and the axis of rotation. It therefore follows that at variable high speeds an ordinary centrifugal governor is too delicate or sensitive and produces too great variations in the advance of the spark when it is adjusted to properly advance the spark for low speeds, and conversely, if the ordinary governor is adjusted to advance the spark properly for high speeds, it fails to properly control the point of ignition when the engine is running at variable low speeds. Therefore, in such engines as are used in propelling motor vehicles, such as automobiles, motor boats and the like, in which the engine is required to run at both low and very high speeds, and at substantially all intermediate speeds, the matter of properly advancing the point of ignition automatically as the speed increases and retarding the point of ignition as the speed is decreasing by means of a governor controlled by centrifugal force becomes a difficult proposition.

The objects of the present invention are to provide a simple, effective and reliable means to automatically advance and retard the point of the ignition of the fuel relative to the stroke of the piston of the internal combustion engine adapted to run at both low and high speeds, and my invention relates particularly to automobile engines and similar internal combustion engines which are subjected to such variable loads and conditions as to continually change the speed of the same, and my invention has for its object the use of centrifugal force exerted by weights or fly-balls rotated directly or indirectly from the crank shaft of the engine; to provide means to impart a sufficient speed and consequently centrifugal force to the weights or fly-balls even when the engine is running slowly as to render and insure a sufficient amount of resultant speed controlling motion as to properly adjust the point of ignition for such slow speeds; to decrease the effective centrifugal force of the weights as the speed of the engine increases, and to conversely increase the effective centrifugal force of the weights or fly-balls as the speed of the engine decreases and thus obtain a more even and regular controlling or resultant motion from the centrifugal weights or fly-balls, whether the speed of the engine be high or low; to make such resultant motion proportional to the amount which the spark or ignition point should be and is advanced or retarded; to employ a comparatively large mass to be subjected to centrifugal force to vary the ignition point, and at the same time to arrange it to occupy a very small space; to obtain by the use of centrifugal force, a resultant force or motion which closely approaches and approximates variations directly proportional to variations in the speed of the engine shaft, and by such resultant motion to automatically advance or retard the timer to make it produce a spark in the igniting circuit at the proper point for any speed at which the engine may run; to give the weights or fly balls a comparatively fast speed of rotation even when the engine is running slowly, and to counterbalance a part of the effective centrifugal force of the governor at high speed; and to provide a reliable and accurate mechanism compact in form, small in size, efficient, simple, and comparatively inexpensive.

Other objects of my invention will appear in the specification and plans below.

Referring now to the drawings forming a part of this application and in which the same part is referred to or designated by the same reference character throughout the various views.

The shaft 1 is the crank shaft of the engine, or a shaft directly driven thereby. To said shaft is rigidly secured a weight carrying member or carrier 2. This member or carrier is clearly illustrated in Figs. 3 and 4, in which a hub portion 3 is provided with oppositely extending arms 4—5, the ends of which are provided with rigid pins 6—7 to which springs, to be later described, may be attached. Extending to the rear of said member and on opposite sides thereof are a pair of diametrically arranged pivot pins 8—9 extending from the same side of said member and in a direction parallel to the axis of the shaft 1 which extends through the opening 10 through the hub or body portion of said weight carrying member, and upon which weights are pivoted in a manner to be described later. The opposite sides of the hub or body portion 3 of said member or carrier are provided with diametrically opposite recesses 11—12.

Figure 3:
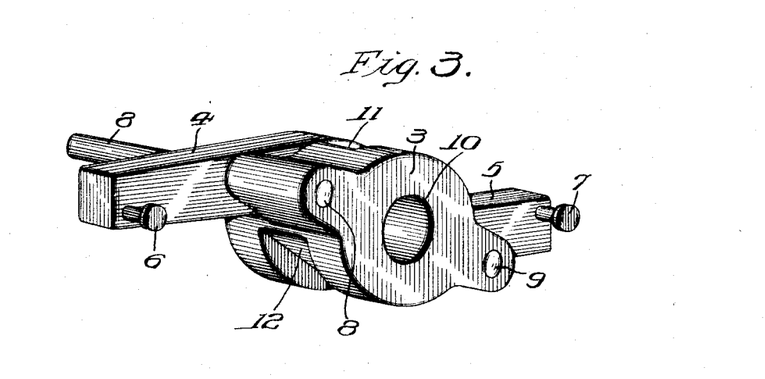
Fig. 3 is a perspective view of one of the members upon which the weights or fly-balls are pivoted and by which they are rotated.
Figure 4:
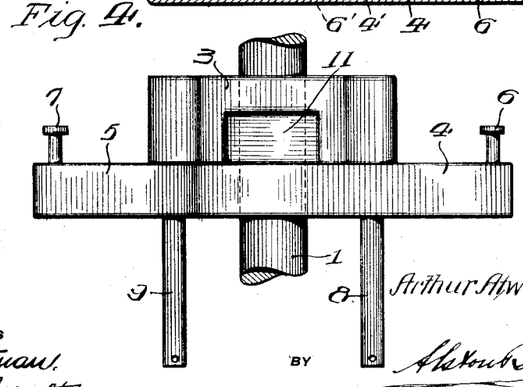
Fig. 4 is a top plan view of the same.

The member or carrier 2 is rigidly secured to the shaft 1 and turns with it but also arranged on the said shaft 1, and loosely mounted so as to rotate thereon, is a second weight-carrying member or carrier 2' which is complemental to the said member 2 in construction and arrangement. The said member or carrier 2' is provided with a hub or body portion 3' and with oppositely extending arms 4'—5', the ends of which are provided with spring engaging pins or studs 6'—7'. Extending from the arms 4'—5' are pivot pins 8'—9', upon which weights are adapted to be pivoted. The said member is also provided with an opening 10' and recesses 11—12 on opposite sides thereof such as are shown in Fig. 3. This member 2' is the complement of the member 2, that is to say, if the member 2 be considered to be "right-hand" in construction then member 2' should be considered a "left-hand" member. Upon each of the said pivot pins 8—9, 8'—9' is mounted a weight or fly-ball which will be more particularly described below but the shape and contour of one of which weights or fly-balls 13 is particularly shown in Fig. 10. The arrangement of the said weights or fly-balls on the said members 2 and 2' and with respect to each other is as follows: Upon the pivot pin 8 of the member 2 is pivotedly mounted a weight 13 and upon the pivot pin 9' of the member 2' is a second similar weight 13' arranged complementary to each other with their free ends adjacent each other. The free ends of the said weights 13 and 13' are, however, pivoted together in any suitable manner as illustrated in the drawings. This is accomplished by providing the weight 13 with a pin 14 rigidly mounted therein and projecting from the side thereof through an opening in alinement therewith in the complementary member 3'. The said rod or pin 14, however, is not rigid with the weight 13' but is free to turn on its axis with respect thereto. Similarly mounted upon the pivot pin 9 of the member 2 is a weight 15 and upon the pivot pin 8' of the member 2' is a similar weight 15' the said weights being constructed and arranged with respect to each other as are the weights 13 and 13', the outer ends of said weights 15 and 15' being similarly pivoted by means of the rod or pin 14'.

Figure 1:
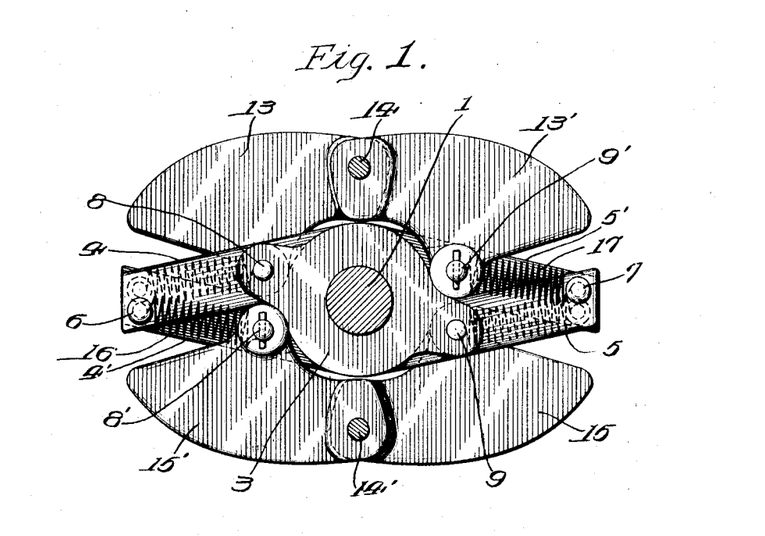
Figure 1 is a side elevational view of my spark advancing mechanism.
Figure 2:
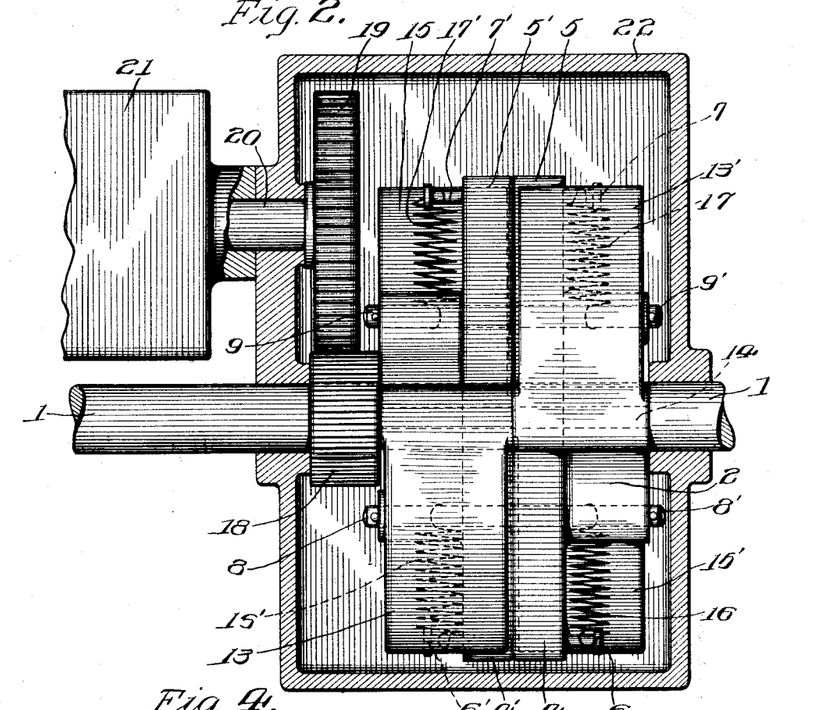
Fig. 2 is a plan view of the same showing the same operatively connected to a timer or contact device.

From this description it will be plain that the weights or fly-balls pivoted upon the pivot pins rigidly mounted in one weight-carrying member are arranged to lie in the plane of the rotation of, and adjacent the hub of, the complemental weight-carrying member, thus providing four pivoted weights or fly balls and two supporting members upon which they are mounted, all arranged in a very small and compact manner with the weights, when the device is not in operation, lying very closely to the axis of the shaft by which they are driven. To hold the said weights in this position above described and to counteract to the desired extent the tendency of the members 2 and 2' to rotate with respect to each other when the shaft is rotated and the fly-balls or weights are acted upon by centrifugal force, I provide springs extending from the pivot pin of one member to a fixed stud or pin on the other member, that is to say, a spring 16 is provided having one end secured to the pivot pin 8' of the member 2' and its other end attached to the stud 6 of the member 2. Following this out a similar spring 17 is secured to the pivot pin 9' of the member 2' and has its other end attached to the stud 7 of the member 2; a third spring 16' connects the pivot pin 8 with the stud 6' while a fourth spring 17' connects the pivot pin 9 with the stud 7'. The above arrangement is perhaps more clearly illustrated diagrammatically in Figs. 6 and 7. The member 2', which is not fast upon the shaft 1, but is fitted to turn thereon, carries a pinion 18 secured thereto and also loose upon the shaft 1, and the said pinion meshes with a gear 19 of double the diameter of the pinion 18, said gear 19 being secured to the shaft 20 of the timer 21, which timer is merely a suitable and a well known mechanical contact device by means of which an electric circuit is made and broken to cause a spark in the sparking circuit of an ignition engine. As shown in Fig. 2, the weights 13—13' and 15—15', the pinion 18 and the gear 19 are suitably housed in a casing 22.

Figures 5, 10:
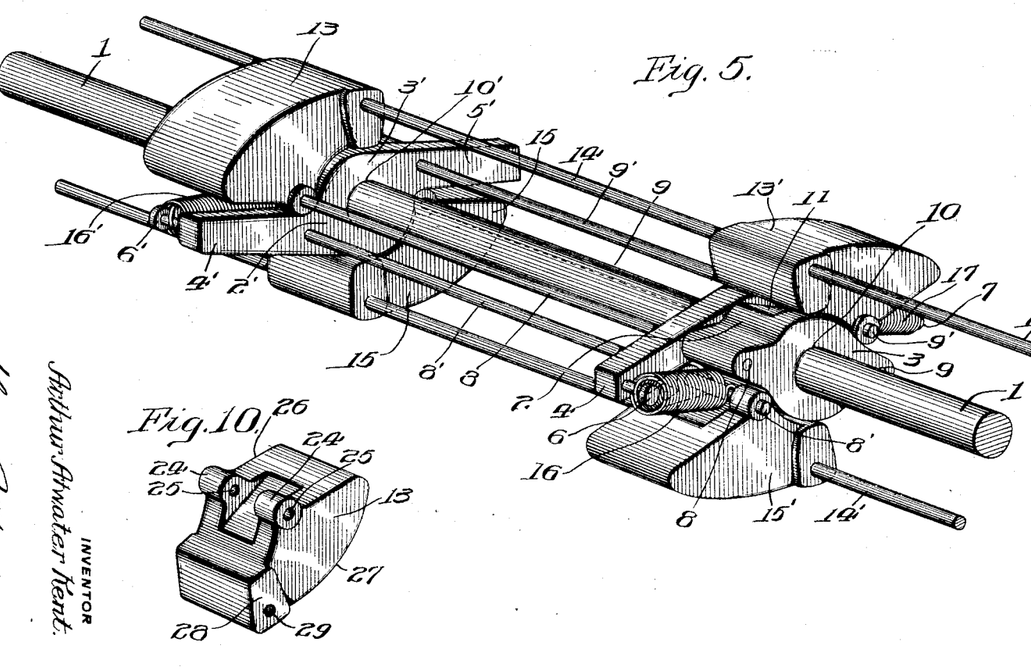
Fig. 5 is a perspective view of the spark advancing mechanism shown in Figs. 1 and 2, but in which the two members upon which the weights or fly-balls are pivoted and rotated are separated from each other and the rods or pivots connecting the same are shown greatly exaggerated in length for the purpose of clearly illustrating the relation of the two said members and the manner of connecting the same and their relations to the fly-balls or weights and to each other.
Fig. 10 is a perspective view of one of the weights.

Having thus described in general the arrangement and disposition of the parts which go together to form my spark advancing mechanism, I will now describe with more particularity the construction of the weights or fly-balls, and for convenience I will merely describe the fly-ball 13, because the other fly-balls are identical therewith in construction, a special reference being had to Fig. 10 of the drawings.

The weight 13 is of brass or other suitable heavy material provided with a pair of spaced lugs 24—24 provided with holes 25—25 therethrough in alinement with each other and adapted for the reception of the pivot pin 8. From the axis of the said holes or openings 25 one side 26 of the body extends radially until it meets the curved side 27, the arc of which is substantially or approximates an arc of the circle in which the fly-balls travel when rotated at their highest speed. One end 28 of said weight is preferably widened so as to be easily squared or milled and fitted closely against the corresponding end of the weight with which it coöperates and to which it is jointed by the rod or pin 14 which fits into the opening 29 extending therethrough. That portion of the weight which is between the lugs 24—24 is preferably cut away sufficiently to form a space for the reception of the spring which is attached to the pivot pin between the said lugs as has been above described.

Figure 6:
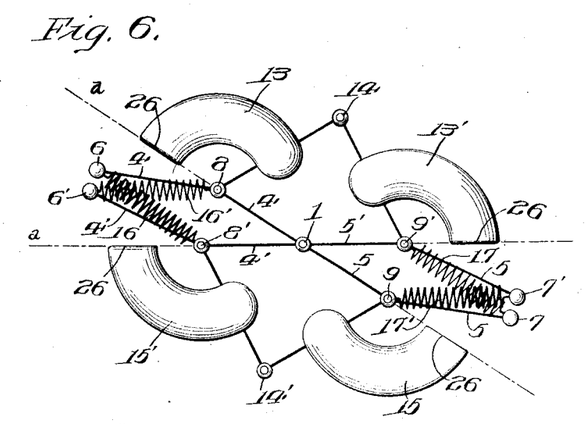
Figs. 6 and 7 are diagrammatic views showing the positions which the weight carrying members and the weights bear to each other at different rotative speeds, and showing the manner in which the spark is advanced and the effective centrifugal force of the weights is varied.
Figure 7:
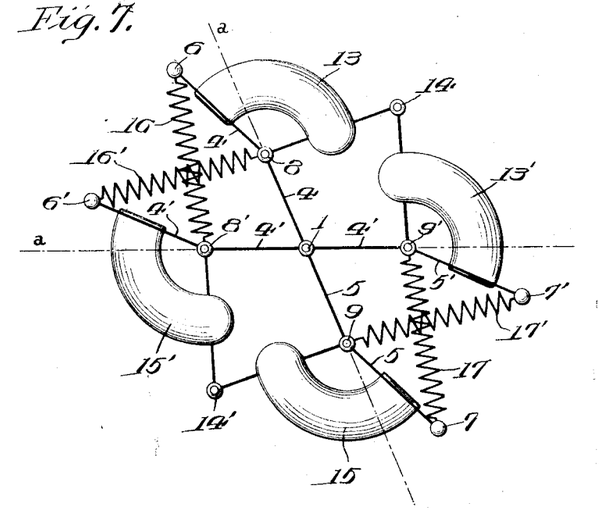

The manner in which the device operates may be readily understood by reference to the diagrammatical views illustrated in Figs. 6 and 7 in which the parts are shown in the position they assume when the device is stationary and that which they assume when rotated. The stationary position is shown in Fig. 6 and it is to be observed that the sides 26 of the weights 13—13', 15—15' are radial to lines passing through the axis of the shaft 1 and the pivot pins 8—9' and 9—8' upon which the same are respectively pivoted. When, now, the shaft 1 is rotated the weights 13—13'—15—15' tend to fly outwardly radially from the axis of the shaft 1 under the influence of centrifugal force, but the pivoting of the free ends of the said weights together causes them to turn about their respective pivot pins 8—9'—9—8', but as they turn the said ends 26 pass upon the other side of the lines passing through their respective pivots and the axis of the shaft 1. The result of this is that as much of the weight as passes beyond said radial line counteracts or counterbalances an equal mass on the other side of the said radial line in each weight, and by so much reduces the effective weight or mass of each weight which the centrifugal force acts upon to turn the same about its pivot. By this arrangement, then, the effective mass of each weight, in so far as that mass tends to turn the weights upon their pivots, is reduced comparatively rapidly and the force tending to turn said weights on their pivots approximates very closely an inverse ratio to the product of the speed and the distance of the center of gravity from the axis of rotation. With this construction attained it will be obvious that the real amount of motion between the members 2 and 2' will be substantially proportional to variations of the speed of rotation of the shaft 1, and the loose member will therefore move from one of its limits of motion toward the other limit an extent which is substantially in a direct proportion to the speed of the shaft.

A further feature of my invention resides in the driving of the weights at the speed of the engine. Many fly-ball governors for internal combustion engines are rotated at a speed less than that of the engine. This results in the generation of too little centrifugal force when the engine is running slowly. This slow speed has been thought necessary, however, because at high speeds the ordinary centrifugal governor rotates at too high a speed to permit it to operate properly. When an engine provided with my above described governor is running at high speeds, the positions assumed by the weights themselves partially counteract a part of the turning moment imparted to them by centrifugal force. I do not obtain any more motion for the same variations in speed than is effected by those changes at lower speeds and thus avoid a supersensitive condition at high speeds. By the use of my improved governor, above described, the governor may be rotated at very high speeds without obtaining the undesirable effects which in other devices result from high speeds, and at the same time the angular movement of the member 2' with respect to the member 2 is substantially directly proportional to variations in the speed of the engine shaft. With this operation of the device in mind it is plain to be seen that as the speed of the engine shaft 1 increases from one speed to a higher speed the fly-balls will be thrown outward against the resistance of the springs 16—16'—17—17', and in so moving, by reason of the pivotal connections between the ends of the fly-ball weights and the manner in which the weights are connected to the members 2 and 2', the member 2 may be caused to turn on the shaft 1 through an angle with respect to the member 2 directly proportional to the variation in speed and this advance of the member 2' will be communicated and transferred through the pinion 19 and gear 20 to the timer shaft.

Figure 8:
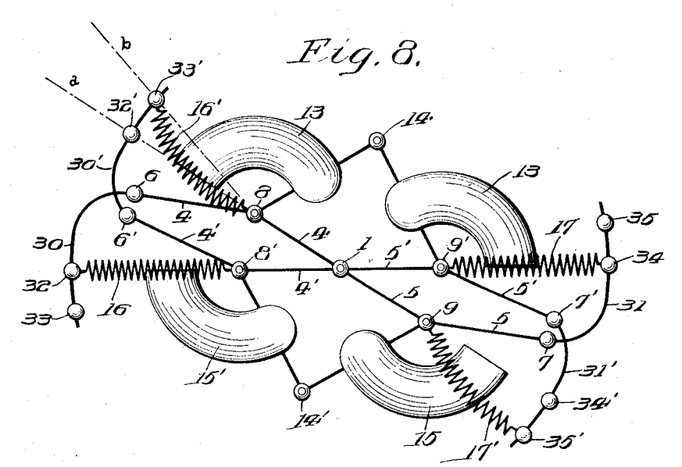
Figs. 8 and 9 are similar diagrammatic views of a modified form of my invention.
Figure 9:
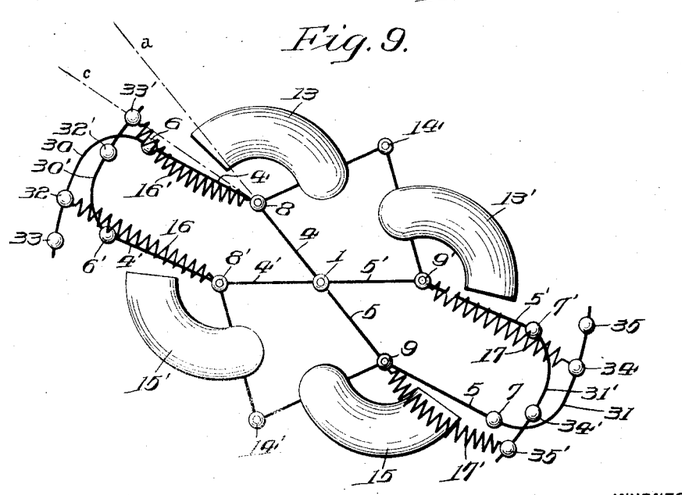

In Figs. 8 and 9 is illustrated diagrammatically a further modified form of my invention in which the arm 4 is extended beyond the point 6 and in an arc substantially concentric with the axis of rotation of the shaft 1. This extension is indicated at 30. At a point 32 thereon in substantial alinement with the points 8' and 1, when the device is at rest, one end of the spring 16 is attached, the other end of the said spring being attached to the pivot 8' of the weight 15'. The arm 5 of the same member is similarly provided with an extension 31 beyond the point 7, the said extension 31 being likewise substantially concentric to the axis of the shaft 1, and the spring 17 is attached to the pivot 9' and to the point 34 on the extension 31, the said point 34 being in substantial alinement with the points 9' of the axis of the shaft when the device is at rest. The springs 16 and 17 are so arranged that they exert some tension between the parts to which they are connected and hold the arms in substantially the position shown in Fig. 8 so long as the shaft 1 is not rotated. The extensions 30 and 31 are shown as being provided with their points 33 and 35, respectively, the purpose of which will be explained below. The arm 4' is provided with an extension 30' extending beyond the points 6' and in an arc concentric to the axis of the rotation of the shaft 1 to the point 33. The spring 16' is attached to said point 33 and to the pivot 8' of the weight 13, but in such a manner that there is no tension between the said points exerted by the spring when the device is in the position of rest. The fact that there is no tension upon the spring is indicated diagrammatically by a curvature of the said spring 16', as plainly seen in Fig. 8. The arm 5' is also provided beyond the point 7 with an extension 31' and between the point 35' thereof and the pivot 9 of the weight 15, the spring 17' extends without exerting tension between the said points. On the said extensions 30' and 31' are indicated the points 32' and 34'. These points 33, 32', 35 and 34' are indicated in order to bring out clearly diagrammatically the manner in which the springs 16 and 17 of the springs 16' and 17' are attached to their respective extensions so that the two can be readily compared and the operation of the device understood. It is also to be understood that while the extensions 30 and 31 are shown as located at a greater distance from the shaft 1 than are the extensions 30' and 31', this difference is merely for the purpose of preventing the lines indicating said arc shaped extensions from coinciding in the diagrammatic view, and resulting in confusion in understanding the operation of the same. In actual practice, however, the four extensions 30, 31, 30' and 31' are preferably substantially equi-distant from the axis of the shaft 1.

The operation of this form of my device is as follows: The parts are shown in the position of rest in Fig. 8, and therefore the springs 16 and 17, the opposite ends of each of which are attached to complemental members, will hold the points 32, 8', 1 and 34 in substantial alinement with each other, as indicated by the line $a$, the pull of the springs 16 and 17 being radial to the shaft 1. Inasmuch as the springs 16' and 17' are loose springs, (i. e. they are not under tension when the device is at rest,) they will not at first affect or modify in any manner the actions of the springs 16 and 17.

When the whole structure is rotated about the axis 1, the centrifugal force developed in the weights 13, 13', 15 and 15' tends to throw them outwardly turning the weights on their pivots and producing a relative motion between the member comprising the parts 30, 4, 5, 31 and the member comprising the parts 30', 4', 5', 31'. The motion of these two parts relative to each other, however, is restrained and the centrifugal force of the weights is balanced by the springs 16 and 17, and they will offer the only spring restraining the counter-balance until at least the points 33′ and 35′ have passed to the other side of the line $a$ passing through the points 8, 1 and 9, a distance equal to the distance between the points 32′ and 33′. In other words, until the line $c$ drawn through the points 32′ and 8 makes the same angle with the line $a$ as it does when the device is at rest, but upon the other side of the said line $a$ as indicated by the line $b$, the springs 16′ and 17′ will not begin to act. Beyond this point, however, these two springs 16′ 17′ will also begin to exert their restraining action to any further relative movement of the two component arms of the device, and at these higher speeds the centrifugal force will be counteracted by all four springs. In this construction it will be apparent that so far as the restraining action of the springs is concerned, there is provided a mechanism in which not merely one set of springs is depended upon to counteract the centrifugal force of the weights. Generally speaking the stretch of a spring is directly proportional to the weight or force exerted upon it; therefore it will be apparent that a single spring is not adapted to properly counterbalance a force such as centrifugal force developed by the rotation of the weights about the shaft 1, which varies, not directly proportional to the speed, but rather as the speed and the distance between each weight and the axis of rotation. We have two variable elements in such a device as I have indicated in embodiments of my invention, and therefore to provide a spring tension which is more equally proportional to the forces which tend to make the weights fly outwardly, I provide one set of springs, as for instance, the springs 16 and 17, to operate alone until a certain or pre-determined speed has been attained. For higher speeds I bring a second set of springs 16′ 17′ into action so that they may add their restraining force to that being exerted by the springs 16—17.

Of course the counterbalancing of the centrifugal force may be further provided for by employing weights of the shape which I have shown in connection with the device illustrated in Figs. 1, 2, 5 and 10 and diagrammatically illustrated in Figs. 6 to 9, the action of which is to make the weight itself counterbalance the force tending to turn it on its pivot. My invention is capable of further modification for it is obvious that other springs might be added if desirable and the same attached to different points upon the curved extensions 30, 30′, 31 and 31′, so as to bring a third or fourth set of springs into successive action as the speed of the device increases, and in this manner I can so proportion the tension of the springs and dispose them with respect to the arms that a substantially perfect counterbalance to the centrifugal force developed in the fly-balls is attained.

By arranging one set of spring means to act in a direction at first radial to the axis of the rotation of the shaft, as shown in Fig. 8 of the drawings, a comparatively slight tension is exerted between the members tending to prevent their separation or the advance of one of the said members relative to the other at or during the rotation of the mechanism at the lower speeds when the centrifugal force is weakest, but the tension of said springs is continually increasing as the arms separate under higher speeds and the points to which the ends are attached tend to separate in a direction more continually approaching and approximating the longitudinal axes of the said springs. As the speed increases and the second spring means, which were at first inactive, are brought into operation, the operation of the said second spring means is similar to that of the first said means, and the spring tension of the same is small at first but increases more and more as the points to which the springs are attached become separated, the second said means supplementing in the same manner, the action of the first spring means, at the times when the centrifugal force is greatest due to the said higher speed, and the increased distance between the axis of the rotation of the device and the center of gravity of the weights, thus providing a spring counter-balance which acts approximately proportionally to the centrifugal force developed in the weights, and consequently a substantially equal or uniform advance or retardation of the loose member, relatively to the fixed member, for the same differences or variations in speed whether the speed of rotation be high or low.

While I have thus described several forms in which my invention is modified I do not wish to be limited to the exact details of construction shown and described inasmuch as the same may be modified and changed as the exigencies of a particular case may require as long as such changes and modified structures fall within the spirit and scope of the appended claims.

Having thus described my invention what I claim and desire to protect by Letters Patent of the United States is:

1. In an automatic spark advancing mechanism, a rotatable shaft, a pair of complemental members on said shaft one fixed and the other loose with respect to said shaft, a pair of diametrically oppositely disposed weights pivoted on each member, the free ends of the adjacent weights on opposite members being pivoted together, and springs for normally holding said weights in their inmost positions, each spring being attached to a weight and to a fixed point in the complemental member.

2. In an automatic spark advancing mechanism, a rotatable shaft, a pair of complemental members on said shaft one loose and the other fixed with respect to said shaft, a pair of oppositely disposed weights pivoted on each of said members, the free ends of said weights on opposite members being pivoted together, and yielding means for normally holding said weights in their positions nearest to the axis of said shaft.

3. In an automatic spark advancing mechanism, a rotatable shaft, a pair of complemental members on said shaft, one of the said members being fixed and the other loose with respect to said shaft, a pair of oppositely disposed weights pivoted on each of said members, with the free ends of adjacent weights on opposite members pivoted together, and yielding means for normally holding said complemental members in a fixed position relative to each other when the shaft is not rotated and to act in opposition to the centrifugal force exerted by said weights when said shaft is rotated.

4. In an automatic spark advancing mechanism, a rotatable shaft, a pair of complemental members on said shaft, one loose and the other fixed with respect to said shaft, means carried by said members to cause the said member which is loose with respect to said shaft to change its angular position on said shaft with respect to said member which is fixed upon said shaft, in substantially direct proportion to variations in the rotative speed of said shaft.

5. In an automatic spark advancing mechanism, a rotatable shaft, a pair of complemental members on said shaft one fixed and the other loose with respect to said shaft, a weight pivoted on each of said members, the free and adjacent ends of said weights being pivoted together and a spring normally holding said weights in their inmost positions, said spring being attached to a weight and to said member to which said weight is not pivoted.

6. In an automatic spark advancing mechanism, a rotatable shaft, a pair of complemental members on said shaft one loose and the other fixed with respect to said shaft, a pair of oppositely disposed weights one pivoted on each of said members, the free ends of said weights being pivoted together, and yielding means for normally holding said weights in their positions nearest the axis of said shaft.

7. In automatic spark advancing mechanism, a driving shaft, a member fixed with respect to said shaft, a second member adjacent said first member, but rotatively movable with respect to said shaft, a weight pivoted on one of said members, a complemental weight pivoted to the other of said members, and a pivotal connection between the free and adjacent ends of said weights, one side of each weight adjacent its pivot being arranged to coincide with a plane within which lies the axis of said shaft and the axis of the pivot upon which said weight turns, when said weights are substantially in their positions nearest the axis of said shaft.

8. In an automatic spark advancing mechanism, a drive shaft, a member fixed with respect to said shaft, a second member adjacent said first member but rotatively movable with respect to said shaft, a weight pivoted on one of said members, a complemental weight pivoted to the other of said members, a pivotal connection between free and adjacent ends of said weights, one side of each weight adjacent its pivot extending substantially normally radial to said shaft, and a spring connecting said members together.

9. In an automatic spark advancing mechanism, a drive shaft, a spark advancing mechanism mounted upon said shaft, and provided with weights arranged to be thrown outwardly by centrifugal force and means to substantially reduce that part of the weights which is acted upon by centrifugal force to advance said spark advancing mechanism as the speed of said drive shaft increases.

10. In an automatic spark advancing mechanism, a drive shaft, a member fast with respect to said shaft, a second member loosely mounted on said shaft, weights pivoted with respect to said members and arranged to be turned on their pivots by the centrifugal force produced by the rotation of said members about the axis of said shaft, and means to reduce that part of the weights tending to turn said weights on their pivots as the speed of said shaft increases.

11. In an automatic spark advancing mechanism, a drive shaft, a member secured to said shaft, a weight pivoted to said member, said weight having one side substantially radial to the axis of said shaft when said shaft is stationary, the pivotal point of said weight being in alinement with said side and the axis of said shaft.

12. In an automatic spark advancing mechanism, a drive shaft, a pair of members mounted on said shaft, one fixed and the other loose with respect to said shaft, and a pair of weights one of which is pivoted to each of said members, each of said weights having a side normally substantially radial to the axis of said shaft and the pivotal point of each of said weights being in alinement with said radial side of said shaft.

13. In an automatic spark advancing mechanism, a drive shaft, a pair of members mounted on said shaft, one fixed and the other loose with respect to said shaft, and a pair of weights one of which is pivoted to each of said members, each of said weights having a side normally substantially radial to the axis of said shaft and the pivotal point of each of said weights being in alinement with said radial side of said weight, the opposite free ends of said weights being pivoted together.

14. In an automatic spark advancing mechanism, a drive shaft, a pair of members mounted on said shaft, one fixed and the other loose with respect to said shaft, a pair of weights one of which is pivoted to each of said members, each of said weights having a side normally substantially radial to the axis of said shaft and the pivotal point of each of said weights being in alinement with said radial side of said weight, the opposite free ends of said weights being pivoted together, and yielding means tending to hold said members in a fixed normal position relative to each other when the shaft is stationary.

15. In an automatic spark advancing mechanism, a drive shaft, a pair of members mounted on said shaft, one fixed and the other loose with respect to said shaft, a pair of weights one of which is pivoted to each of said members, each of said weights having a side normally substantially radial to the axis of said shaft and the pivotal point of each of said weights being in alinement with said radial side of said weight, the opposite free ends of said weights being pivoted together, and means tending to hold said members in a fixed position relative to each other, and the pivoted ends of said weights in their position nearest the axis of said shaft when said shaft is stationary.

16. In an automatic spark advancing mechanism, a carrier fast with respect to said shaft, a weight pivoted to said carrier at a point near said shaft, the outer edge of said weight adjacent said pivot extending normally in a direction substantially radial to said shaft, a second carrier loosely mounted with respect to said shaft, a similar weight similarly pivoted to said second carrier, but arranged complemental thereto, and means to pivotally attach the adjacent ends of said weights to each other.

17. In an automatic spark advancing mechanism, a carrier fast with respect to said shaft, a weight pivoted to said carrier at a point near said shaft, the outer edge of said weight adjacent said pivot extending normally in a direction substantially radial to said shaft, a second carrier loosely mounted with respect to said shaft, a similar weight similarly pivoted to said second carrier, but arranged complemental thereto, means to pivotally attach the adjacent ends of said weights to each other, and a spring attached to the pivotal point of each weight and to the complemental carrier.

18. In a spark advancing mechanism the combination with a rotatable shaft, a member fixed to rotate with said shaft, a second member rotatable with respect to said shaft of a centrifugal governing mechanism operatively connecting said members together, said centrifugal governing mechanism comprising fly weights driven by said fixed member, and arranged to rotate at different distances from the axis of said shaft dependent upon the speed of rotation of said shaft having means to counterbalance the centrifugal force developed in said weight to an extent to cause the distance of the weights from said shaft to vary substantially directly proportionally to the speed of rotation of said shaft, and to communicate said differences in said distance between said weights and said axis of said shaft to said second member to cause an angular advance of said second member with respect to said first member directly proportionally to the changes in the speed of rotation of said shaft, and a contact device driven by said second member.

19. In an automatic spark advancing mechanism a rotatable carrier, a weight pivoted on said carrier and a spring tending to hold said weight in a position within which the greater part of said weight lies on one side of a plane within which lies the axis of the pivot of said weight and the axis about which said carrier rotates, whereby as the speed of the rotation of said carrier increases the weight is turned on its pivot by centrifugal force and more of the weight passes to the other side of said plane and partially counterbalances the force tending to turn said weight on its pivot, and as the speed decreases said spring is operated to move said weight about its pivot in the opposite direction.

20. In an automatic spark advancing mechanism, a drive shaft, a carrier fast with respect to said shaft, a weight pivoted to said carrier at a point near said shaft, the side of said weight adjacent said pivot extending normally in a direction substantially radial to said shaft, a second carrier loose with respect to said shaft, a similar weight similarly pivoted to said second carrier, but arranged complemental to the arrangement of the first carrier and its weight, means to pivotally attach the free ends of said weights to each other, each weight being arranged in the rotative plane of the complemental weight.

21. In an automatic spark advancing mechanism, a driving shaft, a carrier mounted thereon, and a weight pivoted to said carrier, the side of said weight adjacent its pivot extending substantially normally radial to said shaft and in alinement with said pivot and the outer side of said weight adjacent said pivot extending substantially transverse to said shaft, whereby when said shaft is revolved and the weight is acted upon by centrifugal force the weight turns on its pivot and brings a portion of said weight to the other side of a plane passing radially through the axis of said shaft and the pivot of said weight, thereby reducing the mass of said weight which is acted upon by centrifugal force.

22. In an automatic spark advancing mechanism, a driving shaft, a carrier mounted upon said shaft, a weight pivoted on said carrier, one side of said weight extending in a direction substantially radial to said shaft when said shaft is stationary, and the pivot of said weight being in alinement with said side of said weight, whereby in its normal position, the weight is entirely on one side of a plane passing through the axis of said shaft and said pivot.

23. In an automatic spark advancing mechanism, a driving shaft, a carrier mounted upon said shaft, a weight pivoted on said carrier, one side of said weight extending in a direction substantially radial to said shaft when said shaft is stationary, and the pivot of said weight being in alinement with said side of said weight, whereby in its normal position the weight is entirely on one side of a plane passing through the axis of said shaft and said pivot, and when said shaft is rotated and said weight is turned upon its pivot, a part of said weight lies upon the opposite side of said plane.

24. In an automatic spark advancing mechanism, a shaft, a member fast with respect to said shaft, a second member loose with respect to said shaft, a pair of weights each pivotally secured to one of said members, and having their free ends pivotally connected together and a spring connecting said members together, and tending to hold said members in a fixed position relative to each other.

25. In an automatic spark advancing mechanism, a shaft, a pair of members extending outwardly from said shaft, the first of said members being fast with respect to and the other loose with respect to said shaft, a weight pivoted at one end on one of said members, a second weight pivoted at one end of the other of said members, said weights having their free ends pivoted together, and a spring extending from the pivot of each weight to a fixed point on the arm of that member upon which that weight is not pivoted.

26. In an automatic spark advancing mechanism, a shaft, a pair of members extending outwardly from said shaft, the first of said members being fast with respect to and the second of said members being loose with respect to said shaft, a weight pivoted at one end on one of said members, a second weight pivoted at one end of the other of said members, and a spring exerting tension between the pivot of each weight and to the end of the arm of the member to which that weight is not pivoted.

27. In an automatic spark advancing mechanism, a shaft, a pair of members, one of which is fast with respect to and the other of which is loose with respect to said shaft, a pair of weights carried by each of said members, and pivotally secured thereto at diametrically opposite points and arranged on opposite sides of a plane passing through the axis of said shaft and said pivots, a second pair of weights similarly mounted upon said loose member but arranged thereon complementary to the weights upon said first mentioned member, means for pivotally attaching the free ends of the adjacent weights on opposite members together, and a spring extending between said members and tending to hold the same in a fixed position relative to each other.

28. In an automatic spark advancing mechanism, a rotatable shaft, a pair of complemental members arranged on said shaft, weights carried by said members, spring means extending between said members to counteract the tendency of the said weights to fly outwardly under centrifugal force at low speeds and other spring means brought into operation at higher speeds to add further restraining action to that of said first mentioned spring means.

29. In an automatic spark advancing mechanism, a pair of complemental members mounted upon a shaft, one of said members being fast with respect to said shaft and the other loose with respect to said shaft, weights pivoted upon said members with their free ends pivoted together, a plurality of spring means extending between said members to counterbalance the centrifugal force developed in said members by the rotation thereof, each of said springs being successively brought into operation as the speed of the rotation of the device increases.

30. In an automatic spark advancing mechanism, a rotatable shaft, a pair of complemental members mounted upon said shaft, one tight with respect to said shaft and the other loose with respect to said shaft, weights mounted upon said members with the adjacent free ends of each pair of weights pivoted to each other, spring means extending between said members exerting a tendency to prevent a relative movement of said members in the action of centrifugal force developed therein by the rotation of the said shaft and the members carried thereby, said spring means acting in a direction substantially radial to said shaft when the device is in a position of rest.

31. In an automatic spark advancing mechanism, a rotatable shaft, a pair of complemental members mounted upon said shaft, one tight with respect to said shaft and the other loose with respect to said shaft, weights mounted upon said members with the adjacent free ends of each pair of weights pivoted to each other, spring means extending between said members exerting a tendency to prevent a relative movement of said members in the action of centrifugal force developed thereon by the rotation of the said shaft and the members carried thereby, said spring means acting radial in a direction to said shaft when the device is in a position of rest, and a second spring means brought into operation and acting supplemental to said first mentioned spring means at the higher speeds at which the said mechanism may be rotated.

32. In an automatic spark advancing mechanism, a rotatable shaft, a pair of members on said shaft, one fixed with respect to and the other loose with respect to said shaft, a pair of diametrically oppositely disposed weights pivoted on each member, the weight on one of said members being pivoted to the adjacent weight on the other of said members and springs for normally holding said weights in their positions nearest the axis of said shaft, each spring being attached to a weight and to the complemental member.

33. In an automatic spark advancing mechanism, a shaft provided with a member rotatable with respect thereto, a centrifugal governor between said shaft and said member, said member being driven from said shaft through said governor, and a contact device operated by said member.

34. In an automatic spark advancing mechanism the combination of a governing mechanism and a contact device, said governing mechanism comprising a rotatable shaft, a member fixed with respect to said shaft, a second member loose with respect to said shaft, a weight pivoted on one of said members, a second weight pivoted on the other of said members, said weights being arranged complemental to each other and having their free portions pivoted together, a spring connecting said members together, and tending to hold them in a fixed angular relation with respect to each other, said contact device being operated by and from said member loose with respect to said shaft.

35. In an automatic spark advancing mechanism the combination of a governing mechanism and a contact device, said governing mechanism comprising a rotatable shaft, a member fixed with respect to said shaft, a second member loose with respect to said shaft and complemental to said first mentioned member, a weight pivoted on one of said members, a second weight pivoted on the other of said members and arranged complemental to said first mentioned weight, said weights having their free portions adjacent each other pivoted together, a second pair of weights similarly pivoted to said members respectively on the opposite side of said shaft and springs extending from the pivots of each weight to the member complemental to that upon which said weight is pivoted.

36. In an automatic spark advancing mechanism the combination of a rotatable shaft, a pair of members, one fixed to and the other rotatable with respect to said shaft, a pair of oppositely disposed weights, one pivoted on one of said members and the other pivoted on the other of said members, the free portions of said weights being pivoted together, yielding means extending between said members and operated to counter-balance the centrifugal force of said weights, and a contact device driven by said member loose with respect to said shaft.

37. In an automatic spark advancing mechanism, a drive shaft, a carrier fast with respect to said shaft, a weight pivoted to said carrier at a point near said shaft, the side of said weight adjacent said pivot extending normally in a direction substantially radial to said shaft, a second carrier loose with respect to said shaft, a similar weight similarly pivoted to said second carrier but arranged complemental to the arrangement of the first carrier and its weight, and means to pivotally attach said weights to each other, each weight being arranged substantially in the rotative plane of its complemental weight.

38. In an automatic spark advancing mechanism, a rotatable shaft, a pair of members on said shaft, one fixed with respect to and the other loose with respect to said shaft, a pair of diametrically oppositely disposed weights pivoted on each member, the weight on one of said members being pivoted to the adjacent weight on the other of said members, and springs for normally holding said weights in their positions nearest the axis of said shaft, each spring connecting said complemental members together and extending practically radial to said shaft when said weights are nearest the axis of said shaft.

39. In an automatic spark advancing mechanism, a rotatable shaft, a pair of arms, one fixed to and the other rotatable with respect to said shaft, a pair of oppositely disposed weights, one pivoted on one of said arms and the other pivoted on the other of said arms, the free portions of said weights being pivoted together, and yielding means extending between said arms to counterbalance the centrifugal force of said weights when said weights are rotated at high speeds.

40. In an automatic spark advancing mechanism, a rotatable shaft, a pair of arms, one fixed to and the other rotatable with respect to said shaft, a pair of oppositely disposed weights, one pivoted on one of said arms and the other pivoted on the other of said arms, the free portions of said weights being pivoted together, and springs extending between said arms to counterbalance the centrifugal force of said weights when said weights are rotated at high speeds, said springs extending substantially radial to said shaft when said shaft is stationary.

In witness whereof I have hereunto set my hand this seventeenth day of February 1911.

ARTHUR ATWATER KENT.

Witnesses:
GEO. N. RAPSON,
JAMES A. MARTIN.

Copies of this patent may be obtained for five cents each, by addressing the "Commissioner of Patents, Washington, D. C."